(12) United States Patent
Franck

(10) Patent No.: US 11,201,467 B2
(45) Date of Patent: Dec. 14, 2021

(54) REDUCED FLYBACK ESD SURGE PROTECTION

(71) Applicant: Qorvo US, Inc., Greensboro, NC (US)

(72) Inventor: Stephen James Franck, Felton, CA (US)

(73) Assignee: Qorvo US, Inc., Greensboro, NC (US)

( * ) Notice: Subject to any disclaimer, the term of this patent is extended or adjusted under 35 U.S.C. 154(b) by 86 days.

(21) Appl. No.: 16/547,762

(22) Filed: Aug. 22, 2019

(65) Prior Publication Data

US 2021/0057908 A1 Feb. 25, 2021

(51) Int. Cl.
*H02H 9/00* (2006.01)
*H02H 9/04* (2006.01)

(52) U.S. Cl.
CPC ............ *H02H 9/048* (2013.01); *H02H 9/046* (2013.01)

(58) Field of Classification Search
CPC ........ H02H 9/048; H02H 9/046; H02H 9/001; H02H 9/002
See application file for complete search history.

(56) References Cited

U.S. PATENT DOCUMENTS

| | | | |
|---|---|---|---|
| 4,882,657 A | 11/1989 | Braun | |
| 5,191,404 A | 3/1993 | Wu et al. | |
| 5,654,862 A * | 8/1997 | Worley | H03K 17/08104 361/111 |
| 5,946,177 A * | 8/1999 | Miller | H01L 27/0248 361/56 |
| 7,906,371 B2 | 3/2011 | Kim et al. | |
| 8,498,166 B1 * | 7/2013 | Peachey | G11C 7/12 365/189.06 |
| 8,879,222 B2 * | 11/2014 | Singh | H02H 9/046 361/56 |
| 8,910,023 B2 | 12/2014 | Yang | |
| 8,970,023 B2 | 3/2015 | Chou et al. | |
| 9,166,402 B2 * | 10/2015 | Schulmeyer | H02H 9/046 |
| 10,594,135 B2 * | 3/2020 | Singh | H02H 9/046 |
| 10,998,290 B2 | 5/2021 | Watanabe et al. | |
| 2002/0079568 A1 | 6/2002 | Degani et al. | |

(Continued)

OTHER PUBLICATIONS

Non-Final Office Action for U.S. Appl. No. 15/720,686, dated Jun. 14, 2018, 17 pages.

(Continued)

*Primary Examiner* — Sisay G Tiku
(74) *Attorney, Agent, or Firm* — Withrow & Terranova, PLLC

(57) ABSTRACT

Reduced flyback electrostatic discharge (ESD) surge protection is disclosed. An ESD protection circuit differentiates ESD events from normal power on based on supply rise time. During an ESD protection cycle, the ESD protection circuit briefly clamps a supply on an identified ESD edge to limit and protect an electronic device from high voltage and/or current. In some cases, a surge condition may occur as the ESD protection circuit becomes disabled, such as in the presence of a fast rise time power supply. When the power supply is also inductive, a flyback voltage overshoot at the sudden release of the ESD clamp can result in permanent over voltage-related device damage. An exemplary ESD protection circuit includes a controlled disable state which reduces or eliminates flyback during such a surge by gradually ramping down current from the ESD protection cycle.

18 Claims, 5 Drawing Sheets

(56) References Cited

U.S. PATENT DOCUMENTS

| | | | |
|---|---|---|---|
| 2004/0056344 A1 | 3/2004 | Ogawa et al. | |
| 2004/0104469 A1 | 6/2004 | Yagi et al. | |
| 2004/0164425 A1 | 8/2004 | Urakawa | |
| 2007/0109697 A1* | 5/2007 | Huh | H02H 9/046 361/56 |
| 2007/0247772 A1* | 10/2007 | Keppens | H01L 27/0266 361/56 |
| 2009/0256244 A1 | 10/2009 | Liao et al. | |
| 2010/0232078 A1* | 9/2010 | Bhattacharya | H01L 27/0266 361/56 |
| 2012/0228749 A1 | 9/2012 | Pagaila | |
| 2013/0155639 A1 | 6/2013 | Ogawa et al. | |
| 2014/0355157 A1* | 12/2014 | Huang | H02H 9/046 361/56 |
| 2015/0131231 A1 | 5/2015 | Yoo et al. | |
| 2015/0282395 A1 | 10/2015 | Raorane et al. | |
| 2016/0035678 A1 | 2/2016 | Yoo et al. | |
| 2016/0190107 A1 | 6/2016 | Meyer et al. | |
| 2016/0276288 A1 | 9/2016 | Lee et al. | |
| 2016/0351509 A1 | 12/2016 | Dang et al. | |
| 2017/0141081 A1 | 5/2017 | Lee et al. | |
| 2017/0221835 A1 | 8/2017 | Yoo et al. | |
| 2017/0263565 A1 | 9/2017 | Renard et al. | |
| 2017/0290207 A1 | 10/2017 | Smith et al. | |
| 2017/0309575 A1 | 10/2017 | Lee | |
| 2017/0347462 A1 | 11/2017 | Miwa | |
| 2017/0358540 A1 | 12/2017 | Min et al. | |
| 2018/0138130 A1 | 5/2018 | Lin et al. | |
| 2018/0323128 A1 | 11/2018 | Dias et al. | |
| 2019/0020194 A1* | 1/2019 | Liu | H02H 9/041 |
| 2019/0104653 A1 | 4/2019 | Jandzinski et al. | |
| 2020/0075547 A1 | 3/2020 | Siomkos et al. | |
| 2020/0083705 A1* | 3/2020 | Xavier | H02H 9/046 |

OTHER PUBLICATIONS

Notice of Allowance for U.S. Appl. No. 16/115,155, dated Jul. 22, 2020, 13 pages.
Examination Report for European Patent Application No. 18190696.7, dated May 13, 2020, 5 pages.
Final Office Action for U.S. Appl. No. 16/119,554, dated Aug. 5, 2020, 10 pages.
Non-Final Office Action for U.S. Appl. No. 16/119,554, dated Feb. 4, 2020, 9 pages.
Extended European Search Report for European Patent Application No. 18190696.7, dated Dec. 19, 2018, 17 pages.
Examination Report for European Patent Application No. 18190696.7, dated Jul. 27, 2020, 5 pages.
Advisory Action for U.S. Appl. No. 16/119,554, dated Oct. 16, 2020, 3 pages.
Non-Final Office Action for U.S. Appl. No. 16/119,554, dated Nov. 27, 2020, 10 pages.
Intention to Grant for European Patent Application No. 18190696.7, dated Nov. 3, 2020, 29 pages.
Final Office Action for U.S. Appl. No. 16/119,554, dated May 11, 2021, 14 pages.

* cited by examiner great functionality in smaller footprints. Electrostatic discharge (ESD) can occur when a static charge conducts between two surfaces that have different electrical potentials. An IC can experience an ESD during fabrication of the IC, assembly of a device incorporating the IC, and operation of the IC. Without proper protection, static charge movement associated with ESD may generate an electrical current with high enough potential to damage or even destroy passive and active devices (e.g., diodes and transistors) in an IC. As the size of the devices in an IC become smaller, there is greater risk of damaging ESDs occurring during any of fabrication, assembly, and operation of the IC.

REDUCED FLYBACK ESD SURGE PROTECTION

FIELD OF THE DISCLOSURE

The technology of this disclosure relates to surge protection in electronic circuitry.

BACKGROUND

Mobile communication devices drive demand for increased processing capabilities in smaller packages. As a result, increasingly complex integrated circuits (ICs) have been designed and manufactured to provide increasingly

SUMMARY

This application relates to reduced flyback electrostatic discharge (ESD) surge protection. An ESD protection circuit differentiates ESD events from normal power on based on supply rise time. During an ESD protection cycle, the ESD protection circuit briefly clamps a supply on an identified ESD edge to limit and protect an electronic device from high voltage and/or current. In some cases, a surge condition may occur as the ESD protection circuit becomes disabled, such as in the presence of a fast rise time power supply. When the power supply is also inductive, a flyback voltage overshoot at the sudden release of the ESD clamp can result in permanent over voltage-related device damage. An exemplary ESD protection circuit includes a controlled disable state which reduces or eliminates flyback during such a surge by gradually ramping down current from the ESD protection cycle.

An exemplary embodiment relates to an ESD protection circuit. The ESD protection circuit includes a supply node, a ground node, and an ESD clamp coupled between the supply node and the ground node and configured to clamp the supply node when an ESD event is detected. The ESD protection circuit further includes a ramp-down driver coupled to the ESD clamp and configured to gradually disable the ESD clamp to reduce a voltage flyback of the supply node.

Another exemplary embodiment relates to a method for protecting an integrated circuit (IC) from an ESD event. The method includes detecting the ESD event, activating an ESD clamp to clamp a supply voltage in response to detecting the ESD event, and after a predetermined protection period, gradually releasing the ESD clamp to reduce a flyback in the supply voltage.

Another exemplary embodiment relates to an electronic device. The electronic device includes a supply node, a ground node, and a first ESD protection circuit coupled between the supply node and the ground node. The first ESD protection circuit includes a first ESD clamp configured to clamp the supply node when an ESD event is detected and a first ramp-down driver coupled to the first ESD clamp and configured to gradually disable the first ESD clamp after a predetermined protection period.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
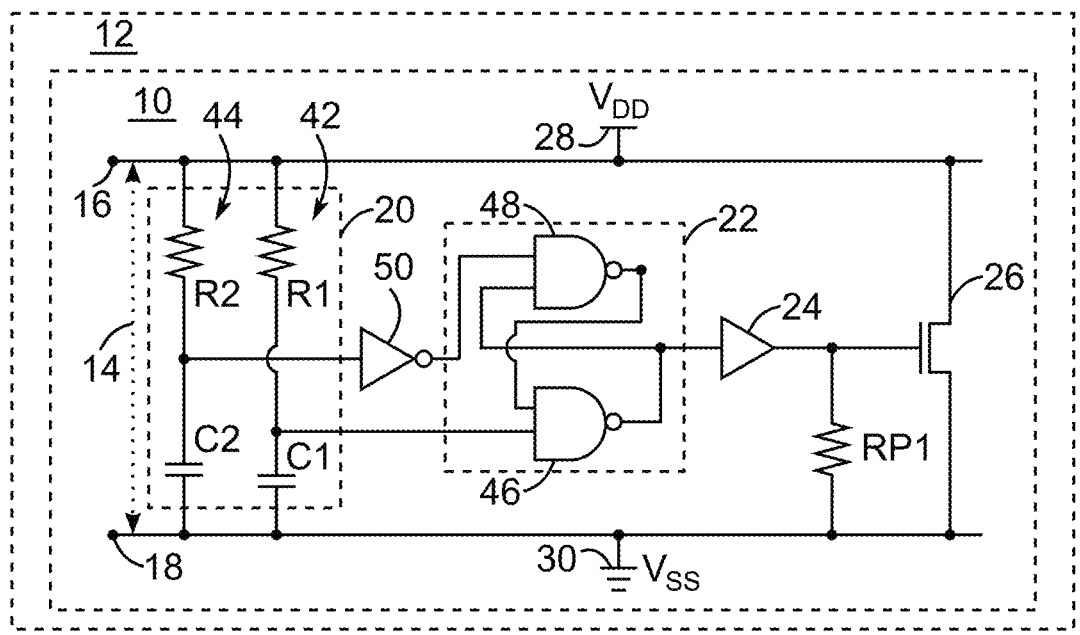
FIG. 1 is a schematic diagram of an exemplary electrostatic discharge (ESD) protection circuit for an integrated circuit (IC).

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

This application relates to reduced flyback electrostatic discharge (ESD) surge protection. An ESD protection circuit differentiates ESD events from normal power on based on supply rise time. During an ESD protection cycle, the ESD protection circuit briefly clamps a supply on an identified ESD edge to limit and protect an electronic device from high voltage. In some cases, a surge condition may occur as the ESD protection circuit is disabled, such as in the presence of a fast rise time power supply. When the power supply is also inductive, a flyback voltage overshoot at the sudden release of the ESD clamp can result in permanent over voltage-related device damage. An exemplary ESD protection circuit includes a controlled disable state which reduces or eliminates flyback during such a surge by gradually ramping down current from the ESD protection cycle.

FIG. 1 is a schematic diagram of an exemplary ESD protection circuit 10 for an integrated circuit (IC) 12. The ESD protection circuit 10 is configured to discharge an ESD event in the IC 12 when a voltage spike 14 between a supply node 16 and a ground node 18 exceeds an ESD threshold voltage. In a non-limiting example, the ESD protection circuit 10 is configured to protect the IC 12 against ESD events during any of fabrication, assembly, and operation of the IC 12. The ESD protection circuit 10 includes a resistor-capacitor (RC) delay 20, a latch 22, a driver 24, and an ESD clamp 26. The supply node 16 and the ground node 18 are coupled to a voltage source 28 and a ground 30, respectively. In a non-limiting example, the voltage source 28 is coupled to a $V_{DD}$ voltage and the ground 30 is coupled to a $V_{ss}$ voltage.

The ESD protection circuit 10 is coupled between the supply node 16 and the ground node 18 and configured to detect an ESD event if the voltage spike 14 exceeds the ESD threshold voltage. When the ESD event is detected, the latch 22 provides an activation signal, which may be logical HIGH, to activate the driver 24 and the ESD clamp 26 to discharge the ESD event in the IC 12. In a non-limiting example, the activation signal may be an electrical current signal.

In an exemplary aspect, the ESD threshold voltage is configured to be higher than the $V_{DD}$ voltage to prevent the ESD clamp 26 from being activated when the IC 12 is powered up for operation by the $V_{DD}$ voltage. By detecting the voltage spike 14 based on the ESD threshold voltage, the ESD protection circuit 10 can avoid missing the voltage spike 14 when the voltage spike 14 is associated with a slow rise time or being falsely activated by the $V_{DD}$ voltage when the IC 12 is powered up.

However, a voltage spike 14 may also occur as the ESD protection circuit 10 is disabled, such as in the presence of a fast rise time voltage source 28. In this regard, the ESD protection circuit 10 is configured to disable the ESD clamp 26 after an interval (e.g., after a predetermined protection period). If the ESD clamp 26 is disabled suddenly when the voltage source 28 providing the $V_{DD}$ voltage to the supply node 16 is inductive, a flyback voltage can occur which could result in permanent damage to the IC 12.

Figure 2:
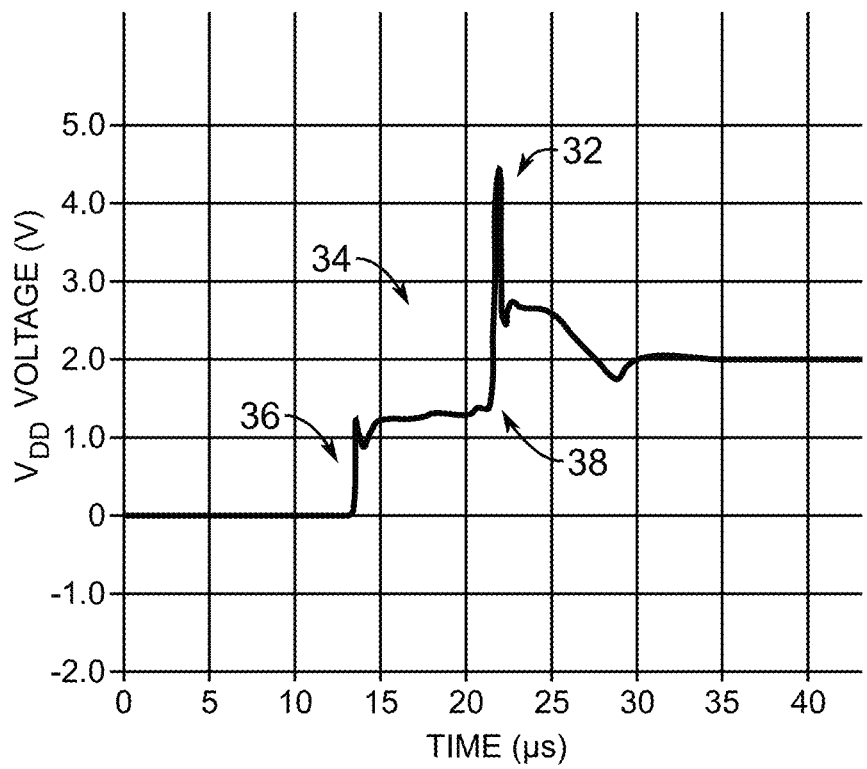
FIG. 2 is a graphical representation of a voltage flyback condition when the ESD protection circuit of FIG. 1 is disabled suddenly.

FIG. 2 is a graphical representation of a voltage flyback condition 32 when the ESD protection circuit 10 of FIG. 1 is disabled suddenly. With reference to FIGS. 1 and 2, a supply voltage 34 (e.g., the $V_{DD}$ voltage) at the supply node is depicted, where the supply voltage 34 is provided by a fast rise time voltage source 28. When the supply voltage 34 experiences a surge 36 with a fast rise time, an ESD condition is indicated and the ESD protection circuit 10 clamps the supply voltage 34 using the ESD clamp 26. When the ESD protection circuit 10 is disabled suddenly 38 (e.g., after the RC delay 20 times out), an inductance in the voltage source 28 causes the flyback condition 32 (e.g., a voltage greater than 3.0 V, such as 4.3 V or greater), which may damage the IC 12.

Figure 3:
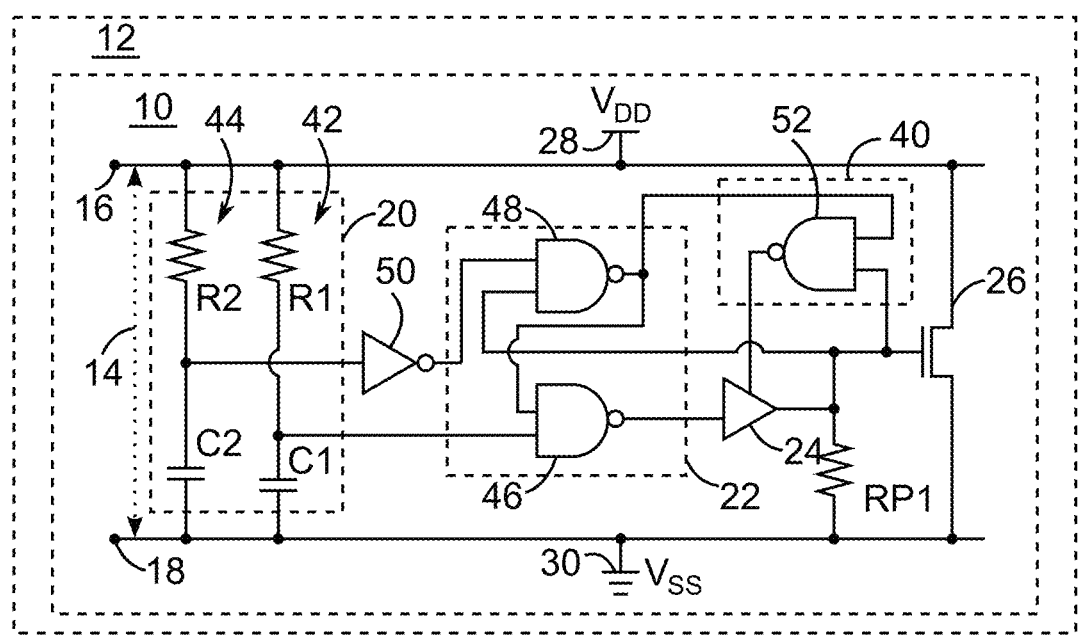
FIG. 3 is a schematic diagram of the exemplary ESD protection circuit of FIG. 1, having a ramp-down driver which reduces or eliminates the voltage flyback condition of FIG. 2.

FIG. 3 is a schematic diagram of the exemplary ESD protection circuit 10 of FIG. 1, having a ramp-down driver 40 which reduces or eliminates the voltage flyback condition 32 of FIG. 2. The ramp-down driver 40 facilitates tri-state driving of the ESD clamp 26. In an enable state, the ESD protection circuit 10 is enabled, and the latch 22 and the driver 24 cause the ESD clamp 26 to close in order to protect the IC 12 from a detected ESD condition. After the RC delay 20 times out, the latch 22 releases and the ESD protection circuit 10 enters a controlled disable state, with the ramp-down driver 40 and the driver 24 causing the ESD clamp 26 to gradually turn off using a pull-down resistor RP1.

The pull-down resistor RP1 controls reducing current from the inductance in the voltage source 28 from the predetermined protection period.

The ESD protection circuit 10 of FIGS. 1 and 3 are illustrated with respect to an exemplary logical configuration. In this regard, the RC delay 20 is illustrated with a fast delay 42 (of 90 nanoseconds (ns) to 110 ns or less) to set the latch 22 using a first resistor R1 and a first capacitor C1 and a slow delay 44 (of 1.9 microseconds (µs) to 2.1 ns) to release the latch 22 at the end of the ESD condition using a second resistor R2 and a second capacitor C2. The latch 22 is illustrated as a NAND-based latch including a first NAND gate 46 coupled to the fast delay 42 and a second NAND gate 48 coupled to the slow delay 44 through a first inverter 50. Finally, the ramp-down driver 40 is implemented using a third NAND gate 52. Feedback is provided to the latch 22 by coupling an input of the second NAND gate 48 to a node between the pull-down resistor RP1 and the ESD clamp 26. This initializes the latch 22 to the off state of the ESD clamp 26.

It should be understood that the ESD protection circuit 10 can be implemented in any IC 12, which can include additional analog or digital components, such as radio frequency (RF) circuits, logic circuits, processing circuits, etc. It should further be understood that embodiments of the ESD protection circuit 10 can be accomplished by multiple equivalent configurations. Example configurations are illustrated with respect to FIGS. 4 and 5 below. Performance of the ESD protection circuit 10 is illustrated with respect to FIG. 6 below.

Figure 4:
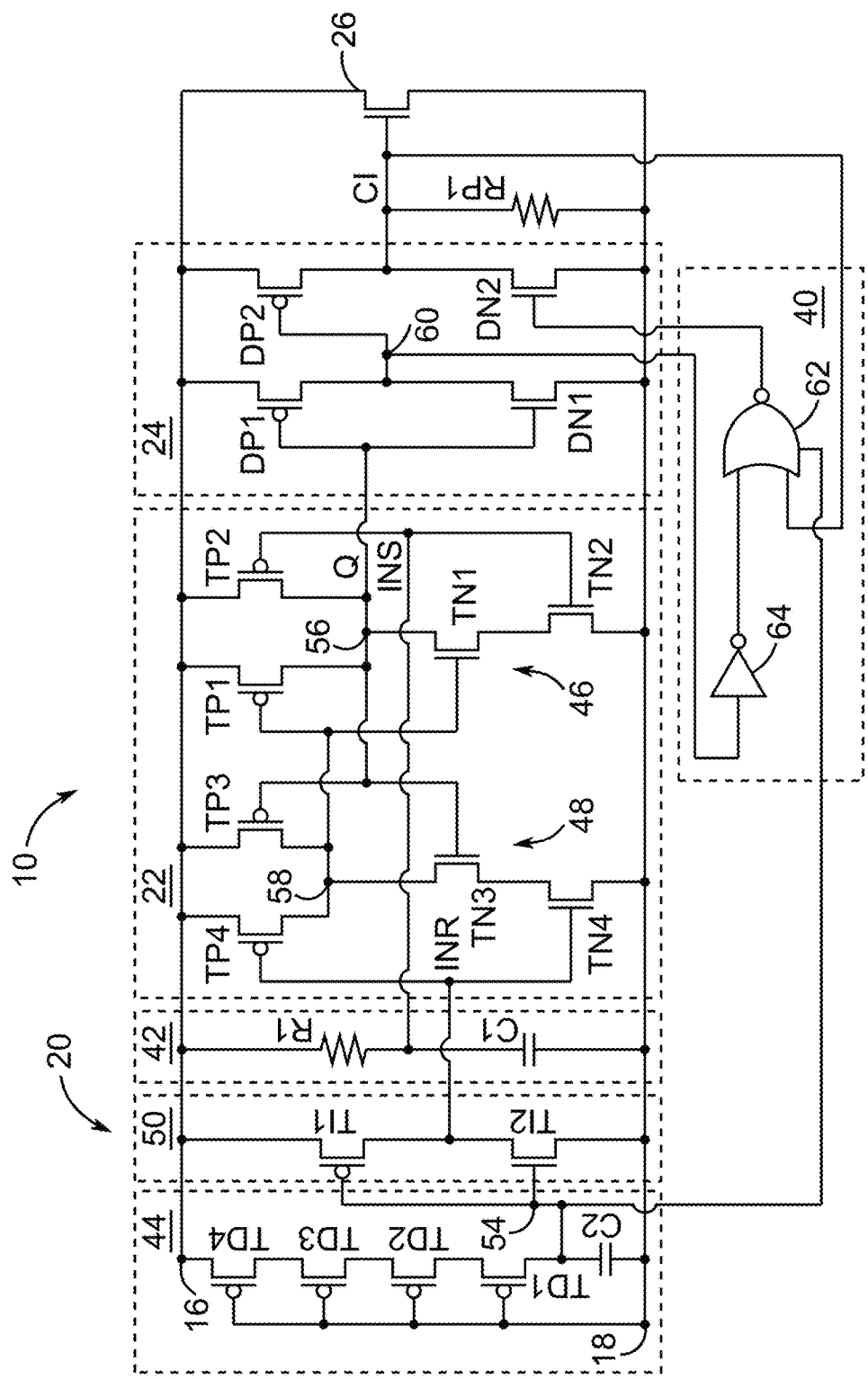
FIG. 4 is a schematic diagram of an embodiment of the exemplary ESD protection circuit of FIG. 3.

FIG. 4 is a schematic diagram of an embodiment of the exemplary ESD protection circuit 10 of FIG. 3. The RC delay 20 includes the fast delay 42 to set the latch 22 on a fast-rising edge of the supply node 16. The fast delay 42 includes the first resistor R1 and the first capacitor C1 coupled in series between the supply node 16 and the ground node 18. In this regard, a latch set input INS of the first NAND gate 46 of the latch 22 is coupled between the first resistor R1 and the first capacitor C1.

The slow delay 44 releases the latch 22 after a predetermined protection period. In this example, the slow delay 44 is implemented with a series of delay transistors TD1, TD2, TD3, TD4 coupled in series with the second capacitor C2 between the supply node 16 and the ground node 18. The series of delay transistors TD1, TD2, TD3, TD4 includes a first delay transistor TD1, a second delay transistor TD2, a third delay transistor TD3, and a fourth delay transistor TD4. In an exemplary aspect, each of the series of delay transistors TD1, TD2, TD3, TD4 is a P-type metal-oxide-semiconductor (MOS) (PMOS) device, such as a MOS field-effect transistor (MOSFET). Other examples can be implemented with more or fewer delay transistors TD1, TD2, TD3, TD4.

In this regard, a latch reset input INR of the second NAND gate 48 of the latch 22 is coupled to the series of delay transistors TD1, TD2, TD3, TD4 and the second capacitor C2. The input of the second NAND gate 48 is coupled to the slow delay 44 through the first inverter 50. In this regard, the input of the second NAND gate 48 is coupled between the first delay transistor TD1 (e.g., a PMOS device) and the complementary second delay transistor TD2 (e.g., an N-type MOS (NMOS) device, such as a MOSFET) of the first inverter 50 coupled in series between the supply node 16 and the ground node 18. The gates of the first delay transistor TD1 and the second delay transistor are coupled to a slow delay node 54 between the series of delay transistors TD1, TD2, TD3, TD4 and the second capacitor C2 (e.g., between the fourth delay transistor TD4 and the second capacitor C2).

In greater detail, the latch 22 is implemented in complementary MOS (CMOS) with the first NAND gate 46 and the second NAND gate 48. The first NAND gate 46 includes a first PMOS transistor TP1 and a second PMOS transistor TP2 coupled in parallel between the supply node 16 and a first NAND connection node 56. The first NAND gate 46 further includes a first NMOS transistor TN1 and a second NMOS transistor TN2 coupled in series between the ground node 18 and the first NAND connection node 56. A gate of the first PMOS transistor TP1 is coupled to a gate of the first NMOS transistor TN1, and a gate of the second PMOS transistor TP2 is coupled to a gate of the second NMOS transistor TN2. The latch set input INS of the first NAND gate 46 is directly coupled to the gate of the second PMOS transistor TP2 and the gate of the second NMOS transistor TN2.

The second NAND gate 48 includes a third PMOS transistor TP3 and a fourth PMOS transistor TP4 coupled in parallel between the supply node 16 and a second NAND connection node 58. The second NAND gate 48 further includes a third NMOS transistor TN3 and a fourth NMOS transistor TN4 coupled in series between the ground node 18 and the second NAND connection node 58. A gate of the third PMOS transistor TP3 is coupled to a gate of the third NMOS transistor TN3, and a gate of the fourth PMOS transistor TP4 is coupled to a gate of the fourth NMOS transistor TN4. The latch reset input INR of the second NAND gate 48 is directly coupled to the gate of the fourth PMOS transistor TP4 and the gate of the fourth NMOS transistor TN4.

The latch 22 is further formed by cross-coupling the first NAND gate 46 and the second NAND gate 48. That is, the first NAND connection node 56 is coupled to the gate of the third PMOS transistor TP3 and the gate of the third NMOS transistor TN3. The second NAND connection node 58 is coupled to the gate of the first PMOS transistor TP1 and the gate of the first NMOS transistor TN1. The latch 22 includes the latch set input INS (e.g., coupled to the first NAND gate 46), the latch reset input INR (e.g., coupled to the second NAND gate 48), and a latch output Q coupled to the first NAND connection node 56.

The driver 24 is also implemented in CMOS. In this regard, an input of the driver 24 is coupled to the latch output Q and an output of the driver 24 is coupled to a clamp input CI of the ESD clamp 26. The driver 24 includes a first driver PMOS transistor DP1 coupled in series with a first driver NMOS transistor DN1 between the supply node 16 and the ground node 18. A gate of the first driver PMOS transistor DP1 is coupled to a gate of the first driver NMOS transistor DN1 and the latch output Q. The driver 24 also includes a second driver PMOS transistor DP2 coupled in series with a second driver NMOS transistor DN2 between the supply node 16 and the ground node 18. A gate of the second driver PMOS transistor DP2 is coupled to a driver connection node 60 between the first driver PMOS transistor DP1 and the first driver NMOS transistor DN1. The clamp input CI of the ESD clamp 26 is coupled between the second driver PMOS transistor DP2 and the second driver NMOS transistor DN2.

The ESD clamp 26 is coupled between the supply node 16 and the ground node 18. The clamp input CI is coupled to a gate of the ESD clamp 26 to enable and disable the ESD clamp 26. In an exemplary aspect, the ESD clamp 26 is implemented with a MOSFET, such as an NMOS. In other examples, the ESD clamp 26 may be implemented differently, such as with a bipolar transistor.

As described above, the ramp-down driver 40 reduces or eliminates voltage flyback conditions when the ESD clamp 26 is disabled by the latch 22 suddenly. The ramp-down driver 40 includes a NOR gate 62 coupled to the driver 24 and the ESD clamp 26 to facilitate tri-state driving of the ESD clamp 26, with an enable state when the latch output Q is logic high, a controlled disable state when the latch output Q transitions to logic low, and a disabled state after a ramp-down period. In this regard, the ramp-down driver 40 introduces a third delay timer using the NOR gate 62, the pull-down resistor RP1, and a gate capacitance of the ESD clamp 26. This functions to gradually turn off the ESD clamp 26 and reduce or eliminate voltage flyback conditions.

In greater detail, an output of the NOR gate 62 is coupled to a gate of the second driver NMOS transistor DN2. A first input of the NOR gate 62 is coupled to the driver connection node 60 through a second inverter 64, and a second input of the NOR gate 62 is coupled to the clamp input CI. The pull-down resistor RP1 (e.g., having a high resistance, such as greater than 500 kilohms (kΩ)) is coupled between the clamp input CI and the ground node 18. Thus, when the latch output Q transitions to logic low, the NOR gate 62 compares a falling clamp input CI voltage to a threshold voltage $V_{TN}$ of a MOSFET. Once the clamp input CI crosses below the threshold voltage $V_{TN}$, the ESD protection circuit 10 enters the controlled disable state where the ramp-down driver 40 holds the clamp input CI to logic low (e.g., the off condition of the ESD clamp 26).

The comparison threshold of the NOR gate 62 is set to the threshold voltage $V_{TN}$ by setting a supply node of the NOR gate 62 to a high Z pull-up (in this example, by coupling the supply node of the NOR gate 62 to the slow delay node 54). Setting the comparison threshold of the NOR gate 62 equal to the threshold voltage $V_{TN}$ facilitates fully and solidly turning off the gate of the ESD clamp 26 as the current drops close to zero. Thus, the ESD clamp 26 is held closed during the ramp-down period (determined by the pull-down resistor RP1 and the gate capacitance of the ESD clamp 26) to gradually turn off the ESD clamp 26.

Figure 5:
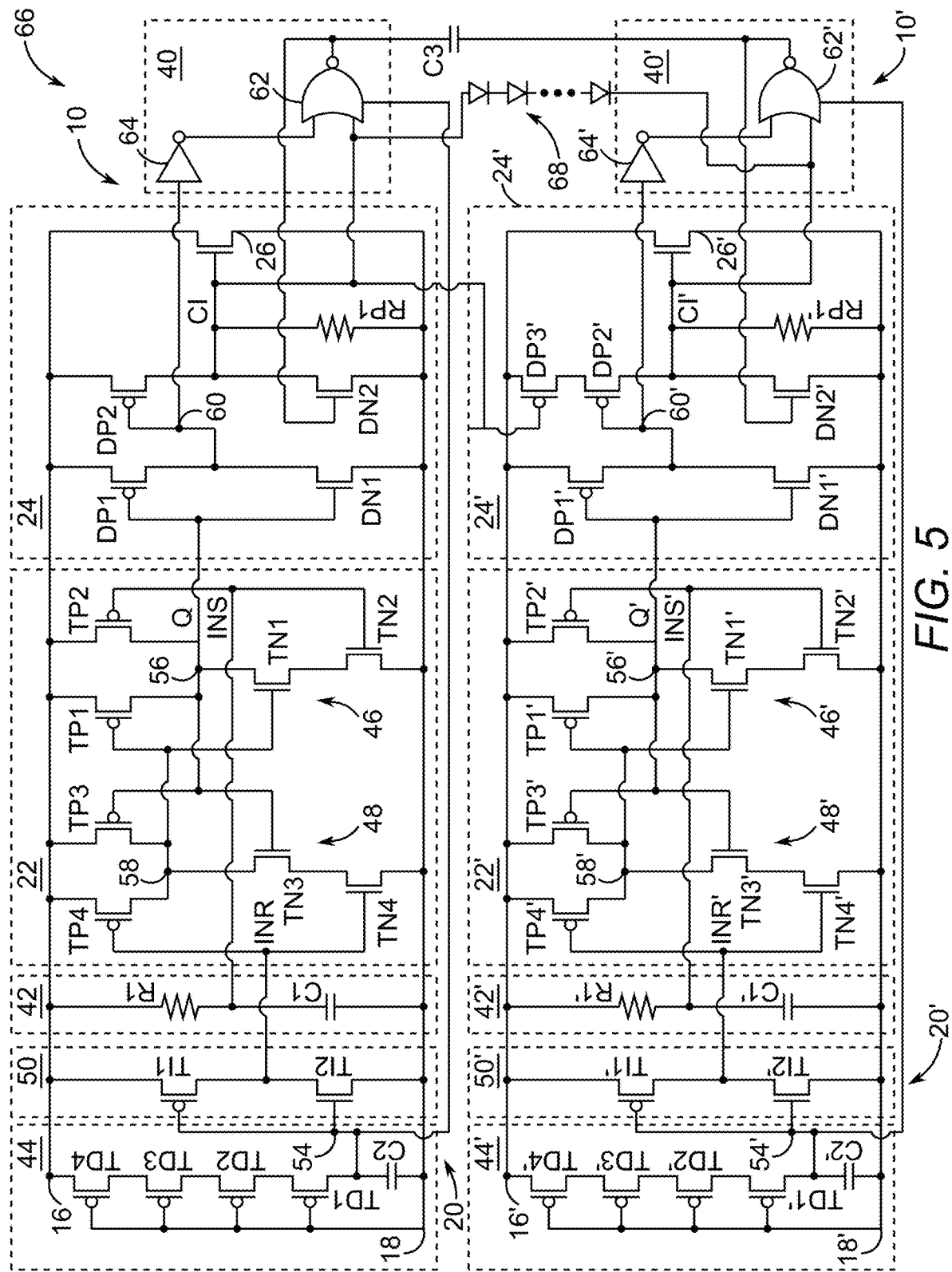
FIG. 5 is a schematic diagram of an exemplary stacked protection circuit based on the ESD protection circuit of FIGS. 3 and 4.

FIG. 5 is a schematic diagram of an exemplary stacked protection circuit 66 based on the ESD protection circuit 10 of FIGS. 3 and 4. The stacked protection circuit 66 includes a first ESD protection circuit 10 and a second ESD protection circuit 10', each of which is based on the embodiment of the ESD protection circuit 10 described above with respect to FIG. 3, with some additional elements to facilitate voltage sharing between the first ESD protection circuit 10 and the second ESD protection circuit 10'. In an exemplary embodiment, the first ESD protection circuit 10 and the second ESD protection circuit 10' are coupled in series, such that respective supply nodes 16, 16' are coupled to the $V_{DD}$ voltage and respective ground nodes 18, 18' are coupled to the $V_{SS}$ voltage.

The stacked protection circuit 66 includes a diode stack 68 coupled between the clamp input CI of the first ESD protection circuit 10 and a clamp input CI' of the second ESD protection circuit 10'. In some examples, the diode stack 68 includes eight diodes in series, which clamps the difference between the respective clamp inputs CI, CI' to $4*V_{BE}$ (base-emitter voltage of a transistor).

This further clamps the voltage across the ESD clamp 26 to $4*V_{BE}+V_{TN}$ during the controlled disable state of the first ESD protection circuit 10. In addition, a third capacitor C3 (e.g., having a small capacitance) is coupled between outputs of NOR gates 62, 62' to synchronize the transition from the controlled disable state to the disable state between the first ESD protection circuit 10 and the second ESD protection circuit 10'. In addition, in the second ESD protection circuit 10', a third driver PMOS transistor DP3' is coupled in series with a second driver PMOS transistor DP2', with its gate coupled to the clamp input CI of the first ESD protection circuit 10.

Figure 6:
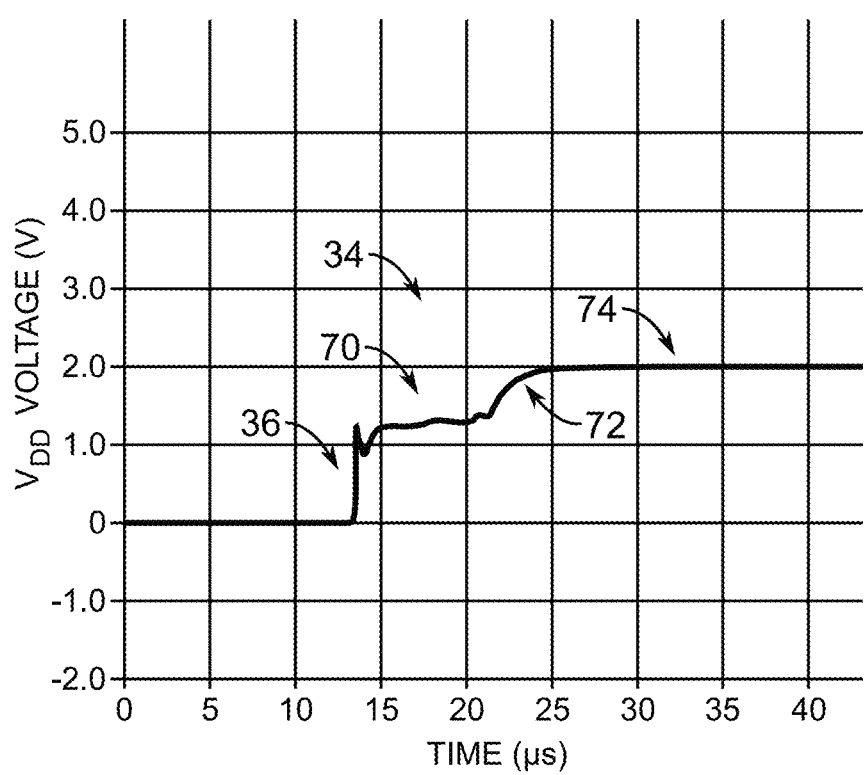
FIG. 6 is a graphical representation of performance of the ESD protection circuit of FIGS. 3 and 4.

FIG. 6 is a graphical representation of performance of the ESD protection circuit 10 of FIGS. 3 and 4. Similar performance is achieved with the stacked protection circuit 66 of FIG. 5. The supply voltage 34 (e.g., the $V_{DD}$ voltage) at the supply node 18 of FIGS. 3 and 4 is depicted. When the supply voltage 34 experiences a surge 36 with a fast rise time, an ESD condition is indicated and the ESD protection circuit 10 enters an enabled state 70, clamping the supply voltage 34 using the ESD clamp 26. When the latch 22 is reset, the ESD protection circuit 10 enters a controlled disable state 72, in which the ESD clamp 26 is gradually disabled and the supply voltage 34 begins to rise slowly. After the controlled disable state 72 (e.g., ramp-down period), the ESD protection circuit 10 enters a disabled state 74 and the ESD clamp 26 is fully released. Due to the gradual disabling of the ESD clamp 26, the flyback condition 32 of FIG. 2 is reduced or eliminated.

Those skilled in the art will recognize improvements and modifications to the preferred embodiments of the present disclosure. All such improvements and modifications are considered within the scope of the concepts disclosed herein and the claims that follow.

What is claimed is:

1. An electrostatic discharge (ESD) protection circuit, comprising:
    a supply node;
    a ground node;
    an ESD clamp coupled between the supply node and the ground node and configured to clamp the supply node when an ESD event is detected;
    a driver coupled to the ESD clamp and configured to activate the ESD clamp for a predetermined protection period when the ESD event is detected;
    a latch configured to provide an activation signal to cause the driver to activate the ESD clamp; and
    a ramp-down driver coupled to the ESD clamp and configured to provide tri-state driving of the ESD protection circuit such that:
        in an enable state, the latch and the driver cause the ESD clamp to close;
        in a controlled disable state, the ramp-down driver and the driver gradually disable the ESD clamp to reduce a voltage flyback of the supply node; and
        in a disable state, the ESD clamp is open.

2. The ESD protection circuit of claim 1, further comprising a delay circuit coupled to the latch and configured to set the latch, causing the ESD protection circuit to enter the enable state for the predetermined protection period when the ESD event is detected.

3. The ESD protection circuit of claim 2, wherein after the predetermined protection period, the ESD protection circuit enters the controlled disable state and the ramp-down driver is configured to gradually disable the ESD clamp during a predetermined ramp-down period.

4. The ESD protection circuit of claim 3, wherein:
    the ESD clamp comprises a metal-oxide-semiconductor field-effect transistor (MOSFET);
    the ramp-down driver is coupled to a gate of the ESD clamp; and
    the predetermined ramp-down period is based on a capacitance of the ESD clamp and a pull-down resistor coupled between the gate of the ESD clamp and the ground node.

5. The ESD protection circuit of claim 2, wherein the latch is configured to cause the driver to disable the ESD clamp after the predetermined protection period.

6. The ESD protection circuit of claim 5, wherein the predetermined protection period is provided by a resistor-capacitor (RC) delay.

7. The ESD protection circuit of claim 5, wherein the predetermined protection period is provided by a series of delay transistors coupled to a capacitor.

8. The ESD protection circuit of claim 1, wherein the ramp-down driver comprises a NOR gate having a first input coupled to the driver, a second input coupled to a gate of the ESD clamp, and an output coupled to a gate of a transistor coupled between the gate of the ESD clamp and the ground node.

9. The ESD protection circuit of claim 1, wherein:
    the latch is a NAND latch implemented in complementary metal-oxide semiconductor (MOS) (CMOS); and
    the driver is implemented in CMOS having a gate of the ESD clamp coupled between a driver P-type MOS (PMOS) transistor and a driver N-type MOS (NMOS) transistor.

10. A method for protecting an integrated circuit (IC) from an electrostatic discharge (ESD) event, comprising:
    detecting the ESD event;
    causing an ESD protection circuit to enter an enable state by using a NAND-based latch to activate an ESD clamp to clamp a supply voltage in response to detecting the ESD event;
    after a predetermined protection period, causing the ESD protection circuit to enter a controlled disable state by gradually releasing the ESD clamp to reduce a flyback in the supply voltage; and after a predetermined ramp-down period, causing the ESD protection circuit to enter a disable state by opening the ESD clamp.

11. The method of claim 10, wherein gradually releasing the ESD clamp comprises holding a gate of the ESD clamp in an off condition while controlling current from a voltage source during the predetermined ramp-down period.

12. The method of claim 10, wherein detecting the ESD event comprises detecting a fast-rising voltage edge of the supply voltage.

13. The method of claim 10, wherein gradually releasing the ESD clamp dissipates inductance in a voltage source from the predetermined protection period.

14. An electronic device, comprising:
   a supply node;
   a ground node; and
   a first electrostatic discharge (ESD) protection circuit coupled between the supply node and the ground node and comprising:
      a first ESD clamp configured to clamp the supply node when an ESD event is detected;
      a first driver coupled to the first ESD clamp and configured to activate the first ESD clamp for a predetermined protection period when the ESD event is detected;
      a first NAND-based latch configured to provide a first activation signal to cause the first driver to activate the first ESD clamp; and
      a first ramp-down driver coupled to the first ESD clamp and configured to gradually disable the first ESD clamp after a predetermined protection period.

15. The electronic device of claim 14, wherein:
   after the predetermined protection period, the first ramp-down driver is configured to gradually disable the first ESD clamp by holding the first ESD clamp off for a predetermined ramp-down period.

16. The electronic device of claim 14, further comprising a second ESD protection circuit coupled to the first ESD protection circuit and comprising:
   a second ESD clamp; and
   a second ramp-down driver coupled to the second ESD clamp and configured to gradually disable the second ESD clamp after the predetermined protection period.

17. The electronic device of claim 16, wherein the second ESD protection circuit is coupled in series with the first ESD protection circuit between the supply node and the ground node.

18. The electronic device of claim 16, further comprising a diode stack coupled between a gate of the first ESD clamp and a gate of the second ESD clamp.

\* \* \* \* \*